United States Patent
Kinoshita et al.

[11] Patent Number: 5,875,686
[45] Date of Patent: Mar. 2, 1999

[54] STEERING COLUMN FOR AUTOMOTIVE VEHICLE

[75] Inventors: Satoshi Kinoshita, Kozakai; Haruhide Kurita, Kosai, both of Japan

[73] Assignee: Fuji Kiko Co., Ltd., Tokyo, Japan

[21] Appl. No.: 733,878

[22] Filed: Oct. 18, 1996

[30] Foreign Application Priority Data

Oct. 20, 1995 [JP] Japan .................................. 7-272348

[51] Int. Cl.$^6$ ....................................................... B60N 1/18
[52] U.S. Cl. ............................................. 74/492; 280/779
[58] Field of Search .............................. 74/492, 493, 777, 74/779, 775

[56] References Cited

U.S. PATENT DOCUMENTS

| | | | |
|---|---|---|---|
| 3,801,123 | 4/1974 | Jira | 280/87 R |
| 3,868,864 | 3/1975 | Durkee et al. | 74/492 |
| 4,703,669 | 11/1987 | Hyodo | 74/492 |
| 5,356,179 | 10/1994 | Hildebrandt et al. | 280/777 |
| 5,497,675 | 3/1996 | Brown et al. | 74/492 |
| 5,690,363 | 11/1997 | Rybinski | 280/779 |

FOREIGN PATENT DOCUMENTS

| | | |
|---|---|---|
| 0 192 776 | 9/1986 | European Pat. Off. . |
| 0 581 432 | 2/1994 | European Pat. Off. . |
| 7-215223 | 8/1995 | Japan . |

*Primary Examiner*—Charles A. Marmor
*Assistant Examiner*—David Fenstermacher
*Attorney, Agent, or Firm*—Foley & Lardner

[57] ABSTRACT

A steering column for an automotive vehicle comprises a jacket tube and a steering shaft which is axially contractible and rotatably disposed through bearings inside the jacket tube. A lower bracket is fixed to a lower end section of the jacket tube. An upper bracket is fixed to a generally intermediate section of the jacket tube. In this steering column, the upper bracket includes a body installation section to be connected to a vehicle body. The body installation section has first and second side portions which are separate from each other. First and second front wall sections respectively extend from and are integral with the first and second side portions of the body installation section. The first and second front wall sections are respectively generally perpendicular to the first and second side portions of the installation section. First and second column installation sections are respectively integral with and generally perpendicular to the first and second front wall sections. The first and second column installation sections extend generally rearward relative to a vehicle body. First and second bent sections is provided such that each is located between each side portion of the body installation section and each of first and second front wall section. Each bent section is adapted to be deformable under a load over a predetermined level such that an angle between the side portion of the body installation section and each of the first and second bend sections decreases. A predetermined clearance is defined between an upper end edge of each of the first and second column installation sections and the body installation section. Additionally, the lower bracket is formed of a plate material and includes a main body section. A body installation section is integral with the main body section and to be connected to the vehicle body. An opening through which the jacket tube extends is formed at least in the main body section and defined by an inner peripheral edge of the lower bracket, in which the jacket tube is securely connected to a part of the inner peripheral edge.

9 Claims, 4 Drawing Sheets

STEERING COLUMN FOR AUTOMOTIVE VEHICLE

BACKGROUND OF THE INVENTION

1. Field of the Invention

This invention relates to improvements in a steering column for an automotive vehicle, and more particularly to the steering column which is intended to reduce the number of component parts and the number of steps in an assembly process thereby lowering a production cost.

2. Description of the Prior Art

A steering column for an automotive vehicle is a device for causing road wheels for steering to be turned under turning of a steering wheel which is mounted on the steering column. In general, the steering column includes a steering shaft which is rotatably supported inside a jacket tube through bearings. The jacket tube is fixed at its generally intermediate part to a vehicle body through an upper bracket and at its lower end part to the vehicle body through a lower bracket. An intermediate shaft is connected at its upper end portion to the lower end portion of the steering shaft and at its lower end portion to a steering gear box.

Now, at an accidental collision of the automotive vehicle, the following dangerous actions will occur: The front end parts of the vehicle move rearward, and therefore the steering wheel projects toward a driver's side through the intermediate shaft and the steering column (i.e., a rearward projection of the steering wheel under a primary collision). Then, the driver moves forward under reaction of the collision of the vehicle body thereby to come into collision with the steering wheel (i.e., a secondary collision). In order to prevent the above dangerous actions, the steering column has been provided with a structure for absorbing a movement stroke of the steering column at the primary collision and a structure for allowing the steering column to be axially contractible at the secondary collision.

As well known, the former structure in connection with the primary collision is arranged to allow the intermediate shaft to be axially contractible thereby to prevent an axial movement of the steering column. Additionally, the former device may include a stopper provided to the steering column to prevent the steering wheel from being projected to the driver's side. The latter structure in connection with the secondary collision is arranged such that each of the jacket tube and the steering shaft is divided into upper and lower sections which are fitted to be axially slidable to each other thereby allowing each of the jacket tube and the steering shaft to be axially contractible. Additionally, the latter structure includes an energy absorbing member for the steering column. Further, the latter structure may include a device for allowing the upper bracket to be get off from the vehicle body owing to the axial contraction of the steering column when the driver comes into collision with the steering wheel.

However, drawbacks have been encountered in the above conventional steering column as set forth below. That is, the conventional steering column is considerably large in number of component parts in order to provide a contractible function under a load over a predetermined level, and therefore is large in number of steps in an assembly process. Additionally, a high precision has been required for the fitting section between the upper and lower sections of the jacket tube and the steering shaft in order to stabilize a stroke load, thereby raising a production cost of the steering column.

Besides, in the conventional steering column, separate component parts are provided as installation members for the steering column to the vehicle body, the stopper for preventing the steering wheel from projecting toward the driver's side at the primary collision and the energy absorbing member functioning at the second collision, This increases the number of the component parts of the steering column and raises a production cost of the steering column.

SUMMARY OF THE INVENTION

It is an object of the present invention to provide an improved steering column for an automotive vehicle, which can effectively overcome drawbacks encountered in conventional steering columns for an automotive vehicle.

Another object of the present invention is to provide an improved steering column for an automotive vehicle, which can reduce the number of component parts of the steering Column thereby reducing the production cost of the steering column.

A further object of the present invention is to provide an improved steering column for an automotive vehicle, which is provided with an upper bracket for connecting a jacket tube to a vehicle body, the upper bracket functioning to prevent a steering wheel from projecting rearward at a primary collision and to absorb the stroke and energy of the steering column at a secondary collision.

A steering column of the present invention is for an automotive vehicle and comprises a jacket tube. A steering shaft is axially contractible and has a major part rotatably disposed through bearings inside the jacket tube. A lower bracket is fixed to a lower end section of the jacket tube. An upper bracket is fixed to a generally intermediate section of the jacket tube. In this steering column, the upper bracket includes a body installation section to be connected to a vehicle body. The body installation section has first and second side portions which are separate from each other. First and second front wall sections respectively extend from and are integral with the first and second side portions of the body installation section. The first and second front wall sections are respectively generally perpendicular to the first and second side portions of the installation section. First and second column installation sections are respectively integral with and generally perpendicular to the first and second front wall sections. The first and second column installation sections extend generally rearward relative to the vehicle body. First and second bent sections are provided such that each is located between each side portion of the body installation section and each of first and second front wall section. Each bent section is adapted to be deformable under a load over a predetermined level such that an angle between the side portion of the body installation section and each of the first and second bend sections decreases. A predetermined clearance is defined between an upper end of each of the first and second column installation sections and the body installation section. Additionally, the lower bracket is formed of a plate material and includes a main body section. A body installation section is integral with the main body section and to be connected to the vehicle body. An opening through which the jacket tube extends is formed at least in the main body section and defined by an inner peripheral edge of the lower bracket, in which the jacket tube is securely connected to a part of the inner peripheral edge.

With the above arrangement of the present invention, a single part or the upper bracket functions to support the steering wheel, to prevent the steering wheel from projecting rearward at the primary collision, and to absorb the energy at the secondary collision, thereby achieving reduction in number of component parts, in number of steps in an assembly process, and in production cost. Additionally, the upper and lower brackets can deform to allow the steering column to axially move, and therefore it is unnecessary to divide the jacket tube into two parts and to fit them to each other, thereby reducing the production cost. Furthermore, a load required for deforming the upper bracket is decided by the shape of the bent section of the upper bracket, and therefore the load can be stabilized.

BRIEF DESCRIPTION OF THE DRAWINGS

In the drawings, like reference numerals designate like parts and elements throughout all figures, in which.

DETAILED DESCRIPTION OF THE INVENTION

Figure 1:
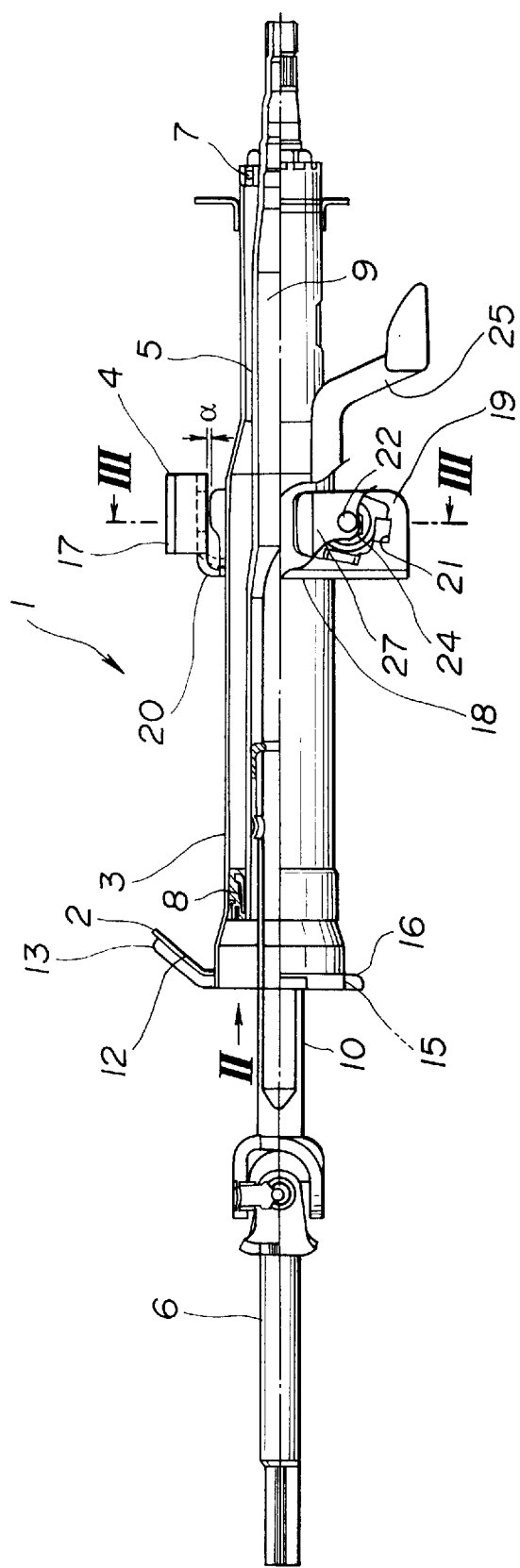
FIG. 1 is a side view, partly in section, of an embodiment of a steering column according to the present invention.
Figure 2:
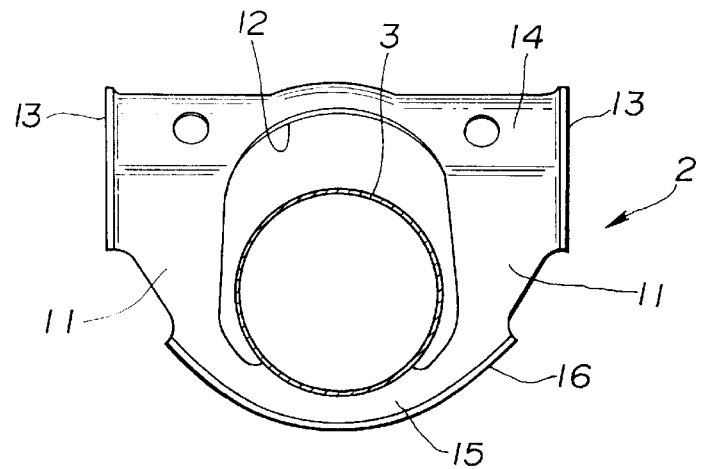
FIG. 2 is a front view, partly in section, as viewed from a direction of an arrow II in FIG. 1.
Figure 3:
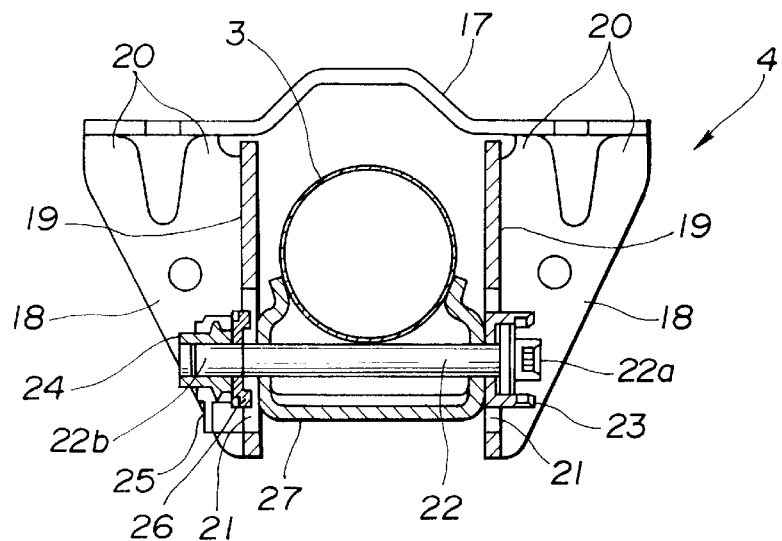
FIG. 3 is a view taken in the direction of arrows substantially along the line III—III of FIG. 1.

Referring now to FIGS. 1 to 3 of the drawings, an embodiment of a steering column for an automotive vehicle is illustrated by the reference numeral 1. The steering column I comprises a jacket tube 3 which is provided at its longitudinal central section with an upper bracket 4 and at its lower end section with a lower bracket 2. A steering shaft 5 is disposed inside the jacket tube 3 in a manner to extend along the axis of the jacket tube 3. A steering wheel (not shown) is connected to an upper end section of the steering shaft 5. An intermediate shaft 6 to be connected to a steering gear unit (not shown) is connected through a universal joint type coupling (not identified) to a lower end section of the steering shaft 5.

A bearing 7 is fixed inside the upper end section of the jacket tube 3. The lower end section of the jacket tube 3 is bulged so as to be increased in inner diameter. A bearing 8 is disposed inside the jacket tube 3 at a position immediately above the bulged lower end section. The steering shaft 5 is rotatably supported by the bearings 7, 8 which are separate from each other. The steering shaft 5 includes an upper shaft 9 which has a lower portion which has an inner peripheral surface which is generally oval in cross-section. The upper end section of the upper shaft 9 projects from the upper end of the jacket tube 3. The steering shaft 5 further includes a lower shaft 10 which is aligned with the upper shaft 9 and has a generally oval cross-section in its outer peripheral surface. The upper end section of the upper lower shaft 10 is fitted into the lower end section of the upper shaft 9 throughout a predetermined length thereby constituting a fitting connection part (no numeral). In this fitting connection part, a plastic member (not identified) is interposed between the upper shaft 9 and the lower shaft 10 so that the upper and lower shafts 9, 10 are secured to each other to serve as a single body. The plastic member is adapted to be broken when a load over a predetermined level is applied axially to the plastic member, so that the upper shaft 9 can slide into the lower end section of the upper shaft 9 thereby contracting the steering shaft 5.

As shown in FIG. 2, the lower bracket 2 is formed of a steel plate or sheet and has a large opening 12 in which the jacket tube 3 is disposed or loosely fitted in a manner to extend through the steel plate to form a crescentic space between the outer periphery of the jacket tube 3 and the inner periphery of the lower bracket 2 which periphery defines the opening 12. The steel plate of the upper peripheral section of the lower bracket 2 is bent to be inclined rearward to form a body installation section 14 to be connected to a vehicle body (not shown). The body installation section 14 is provided at its left and right-side end sections with reinforcement flanges 13, 13 each of which is formed by bending the left or right-side end section at right angles, so that each reinforcement flange 13 is perpendicular to the main body of the steel plate. The jacket tube 3 is welded at its outer peripheral surface with an inner peripheral section of the lower bracket 2 defining the opening 12 in such a manner that the jacket tube 3 is perpendicular to the main body of the steel plate of the lower bracket 2. A part of a lower peripheral section 15 of the steel plate of the lower bracket 2 is bent upwardly at right angles to form a reinforcement flange 16 which is located below the inner peripheral section at which the jacket tube 3 is welded. It is to be noted that the intermediate side sections 11, 11 of the steel plate of the lower bracket 2 is able to bend so as to cope with a tilt operation of the steering column 1. In other words, when the steering column 1 is tilted, the intermediate side sections deform to be slightly bent to absorb the tilt movement of the steering column 1. It will be understood that a tilting angle of the steering column 1 is not so large while the lower bracket 2 is elastically deformable, and therefore no breakage will occur in the lower bracket 2.

As shown in FIG. 3, the upper bracket 4 is formed of a steel plate or sheet and includes a body installation section 17 which is connected to the vehicle body. Front wall sections 18, 18 extend from the opposite sides (the right and left side portions F, F) of the front portion of the body installation section 17 in such a manner as to be perpendicular to the installation section 17. Column installation sections 19, 19 extend respectively from the inside portions of the front wall sections 18, 18 and perpendicular to the front wall sections 18, 18 or in a direction along the axis of the jacket tube 3, in which the jacket tube 3 is located between the opposite column installation sections 19, 19. The body installation section 17, the wall sections 18, 18 and the column installation sections 19, 19 are formed integral with each other to form a one-piece structure. A smooth or rounded bent section 20 is formed between each side portion F of the installation section 17 and each front wall section 18 as shown in FIG. 1, in which the bent section 20 has a predetermined curvature. The bent section 20 can be deformed under a load over a predetermined level. A clearance α is formed between the installation section 17 and the upper end edge of each column installation section 19 as shown in FIG. 1.

The column installation sections 19, 19 are respectively formed with rectangular openings 21, 21 which extend generally in a perpendicular direction. A tightening bolt 22 is disposed to extend through the rectangular openings 21, 21. The tightening bolt 22 has a head section 22a which is fixed to a rotation-preventing member 23 which is slidably fitted in the rectangular opening 21. The tightening bolt 22 is formed at its tip end section with a threaded part 22b to which a nut 24 is engaged. The nut 24 is fixed to a tilt lever 25. A tightening member 26 is interposed between the nut 24 and the column installation section 19, in which the tightening member 26 is engaged in the rectangular opening 21 in a manner to be prevented from its rotation. A distance bracket 27 is disposed between the opposite column installation sections 19, 19 in such a manner that the opposite end sections of the distance bracket 27 are respectively in contact with the column installation sections 19, 19. The tightening bolt 22 also extends through the distance bracket 27. The distance bracket 27 is welded to the lower surface of the jacket tube 3 and is movable generally vertically together with the tightening bolt 22 thereby constituting a tilting mechanism for the jacket tube 3. In the state of FIG. 1, the distance bracket 27 is interposed and pressed between the column installation sections 19, 19 which are pressed in a direction to approach each other by tightening the nut 24 engaged with the tightening bolt 22, in which the column installation sections 19, 19 are put between the nut 24 and the head section 22a of the tightening bolt 22.

Accordingly, when the tilt lever 25 is turned downward to rotate the nut 24, a tightening action of the column installation sections 19, 19 to the distance bracket 27 is loosened, and therefore the distance bracket 27 becomes movable in both the generally upward and downward directions. Then, the jacket tube 3 is tilted through the steering wheel to take a desired inclined state, in which the jacket tube 3 can be rotatingly moved generally vertically around a position at which the jacket tube 3 is welded to the inner peripheral section of the steel plate of the lower bracket 2. It win be understood that the lower bracket 2 is prevented from being broken because the maximum angle of tilting of the jacket tube 3 is small while the lower bracket 2 makes its elastic deformation.

When the tilt lever 25 is restored to its original position shown in FIG. 3, the jacket tube 3 is locked to keep the above inclined or tilted state. In other words, the distance bracket 27 is put between the column installation sections 19, 19 under pressure developed between the head section 22a of the tightening bolt 22 and the nut 24. As a result, the distance bracket 27 is fixed between the column installation sections 19, 19 under friction.

Next, a manner of operation of the steering column 1 will be discussed.

At a primary collision in a head-on collision, the front-side parts of the vehicle body move rearward, and therefore the jacket tube 3 is moved rearward in the vehicle body. In this case, the front wall sections 18, 18 of the upper bracket 4 are pushed rearward so that the upper end edge of the column installation sections 19, 19 moves toward the installation section 17 reducing the clearance a and finally comes into contact with the lower surface of the installation section 17. Thus, a rearward movement of the jacket tube 3 is stopped.

At a secondary collision following the primary collision, when the load of a driver or vehicle passenger is applied to the steering wheel, the jacket tube 3 moves forward and therefore the bent sections 20, 20 are so deformed that the bending angle thereof increases, thereby absorbing an energy of collision. Additionally, the lower bracket 2 is also deformed thereby to absorb an axial movement of the jacket tube 3.

Figure 4:
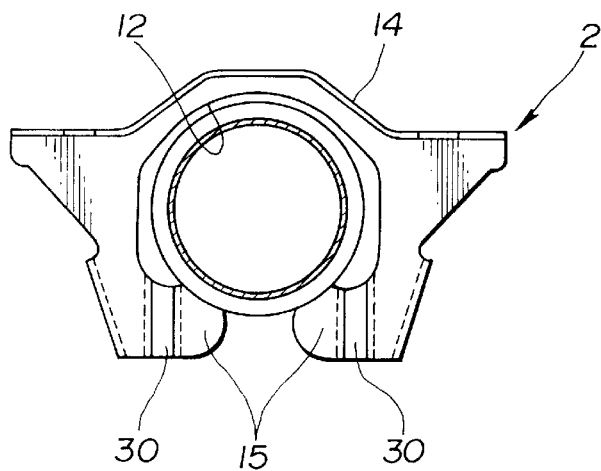
FIG. 4 is a front view of a modified example of a lower bracket used in the steering column of FIG. 1.

In case that no sufficient distance can be taken between the body installation section 14 and the welded position of the jacket tube 3 to the lower peripheral section 15, a stroke or axial movement of the jacket tube 3 necessary at the secondary collision may not be attained. In view of this, the lower peripheral section 15 (to which the jacket tube 3 is welded) of the lower bracket 2 may be divided into two parts which are separate from each other as shown in FIG. 4, in which each part is formed with a rounded bent portion 30. The bent portion 30 may not be rounded and therefore it is sufficient that there is a bent portion which is formed by bending the steel plate.

Figure 5A:
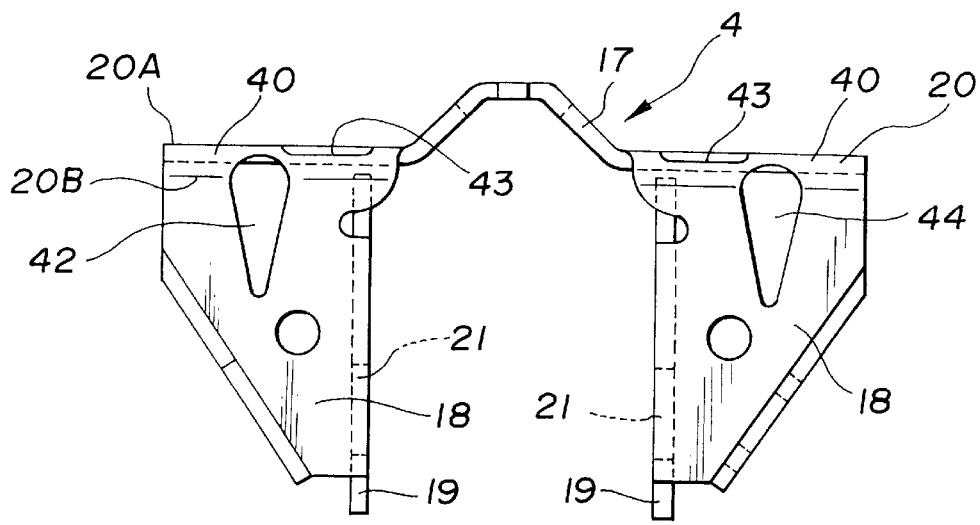
FIG. 5A is a front view of a modified example of an upper bracket used in the steering column of FIG. 1.
Figure 5B:
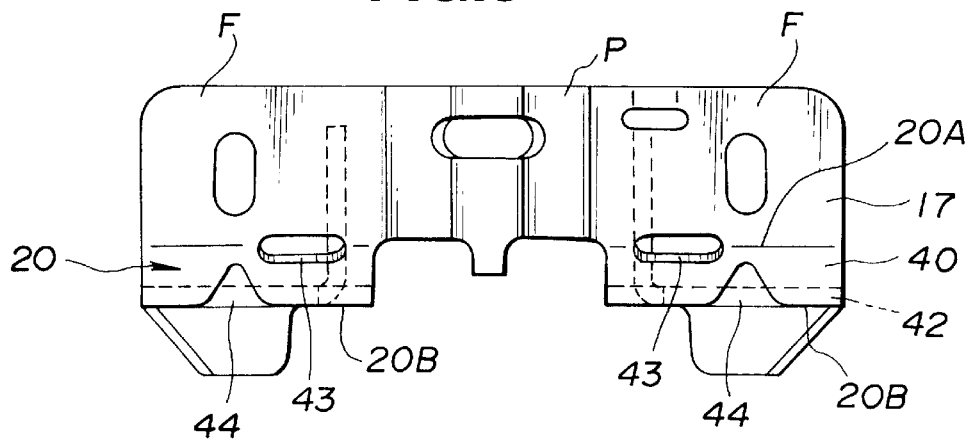
FIG. 5B is a plan view of the upper bracket of FIG. 5A.
Figure 5C:
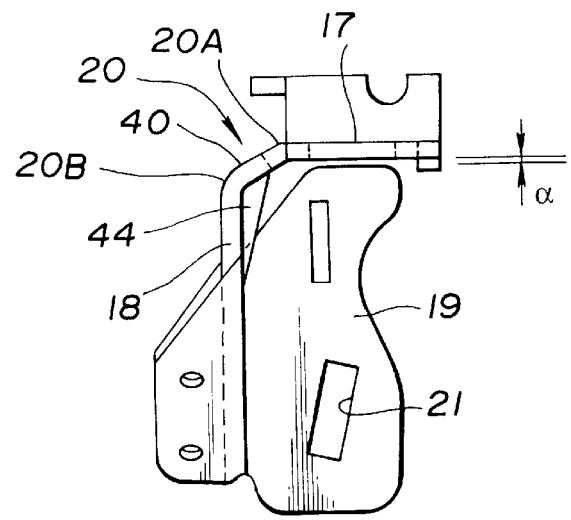
FIG. 5C is a side view of the upper bracket of FIG. 5A.

FIGS. 5A, 5B and 5C illustrate a modified example of the upper bracket 4 forming part of the above embodiment steering column 1. The upper bracket 4 of this example has the bent sections 20, 20 each of which is formed between each flat side portion F of the installation section 17 and each front wall section 18. Each bent section 20 includes a flat plate or sheet portion 40 which extends perpendicularly to an imaginary plane (not shown) including the axis of the jacket tube 3. The flat plate portion 40 has a predetermined width and is formed inclined at an angle of about 30 degrees relative to each of the flat side portions F, F which are located at the opposite sides of a central projected portion P. Each flat plate portion 40 is integrally connected through a linear bent portion 20A with the flat side portion F, and integrally connected through a linear bent portion 20B with the front wall section 18. Two opposite adjustment holes 43, 43 are formed respectively along the opposite linear bent portions 20A, 20A. Additionally, two ribs 44, 44 are provided in such a manner that each 44 of them is formed between the each front wall section 18 and the installation section 17 and located at the backside of the bent section 20.

Figure 6:
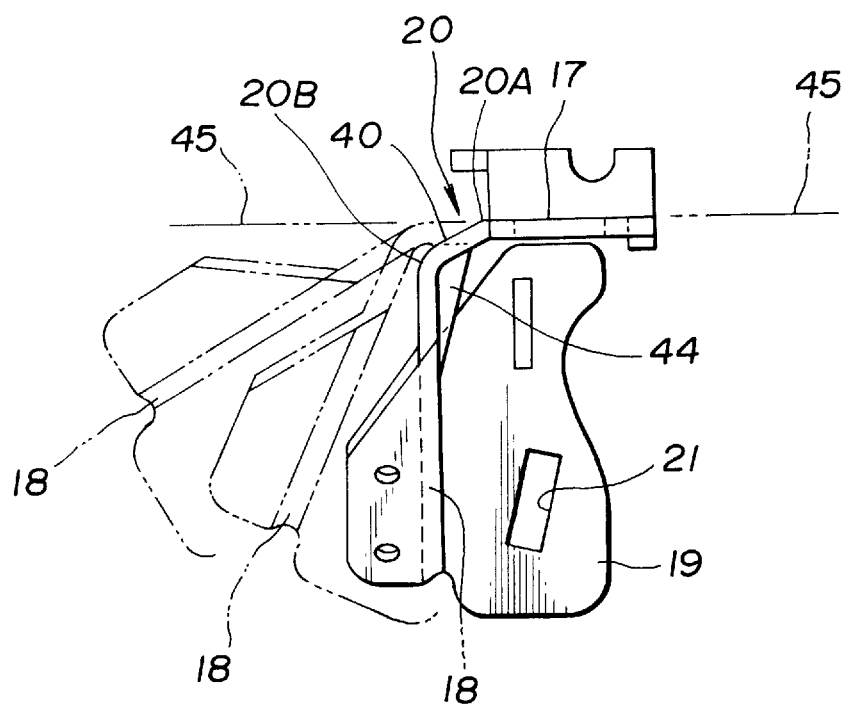
FIG. 6 is a side view similar to FIG. 5C but showing an operation of the upper bracket of FIG. 5A.

Accordingly, the two linear bent portions 20A, 20B are formed in the bent section 20. At the secondary collision, when an impact load is applied to the location of the rectangular openings 21 through the jacket tube 3, the front wall sections 18 are rotationally moved forward as shown in FIG. 6. In this movement process, first the front wall sections 18 are rotationally moved around the linear bent portions 20A so as to increase the angle between the flat plate portion 40 and the installation section 17, and then the front wall sections 18 are rotationally moved around the linear bent portions 20B so as to increase the angle between the front wall section 18 and the flat plate portion 40 upon the linear bent portion B coming into contact with a surface 45 of the vehicle body at which the installation section 17 is installed. Thus, the upper bracket 4 of this example exhibits a two-stage energy absorbing effect. More specifically, the steering column 1 is installed inclined relative to the vehicle body, and the upper bracket 4 receives load in the axial direction of the steering column and vertical load at the second collision. Accordingly, first the flat plate portion 40 rotationally deformed upwardly around the linear bent portion 20A, and therefore a vertical component of a force input obliquely to the axis of the jacket tube 3 can be absorbed. Thus, it is possible to decrease an initial load of impact at the secondary collision. It will be understood that the adjustment holes 43, 43 of the linear bent portions 20A, 20A is formed to lower the bending strength of the linear bent portions 20A, 20A thereby to adjust the initial load to be applied at the initial period of the collision. The ribs 44, 44 are formed to adjust the load during the course of collision. Thus, the loads are suitably adjustable thereby improving an energy absorbing characteristics during the secondary collision.

As discussed above, according to the embodiment according to the present invention, the upper bracket 4 for supporting the jacket tube 3 on the vehicle body functions to suppress the rearward projection of the steering wheel at the first collision and functions to absorb the stroke and energy of the steering column at the second collision. Accordingly, the structure of the steering column is simplified thereby reducing the number of steps in production process of the steering column while achieving a cost reduction.

What is claimed is:

1. A steering column for an automotive vehicle, comprising:
    a jacket tube;
    a steering shaft which is axially contractible and has a major part rotatably disposed through bearings inside said jacket tube;
    a lower bracket fixed to a lower section of said jacket tube; and
    an upper bracket secured to a generally intermediate section of said jacket tube;
    wherein said upper bracket includes
        a body installation section for connecting to a vehicle body, said body installation section having first and second side portions which are separate from each other,
        first and second front wall sections which respectively extend from and are integral with the first and second side portions of said installation section, said first and second front wall sections being respectively generally perpendicular to the first and second side portions of said installation section,
        first and second column installation sections which are respectively integral with and generally perpendicular to the first and second front wall sections, said first and second column installation sections extending generally rearward relative to the vehicle body, the generally intermediate section of said jacket tube being secured to said first and second column installation sections,
        first and second bent sections each of which is located between each side portion of said body installation section and each of said first and second front wall section, each bent section being adapted to be deformable under a load over a predetermined level such that an angle between the side portion of said body installation section and each of said first and second bent sections decreases, and
        means defining a predetermined clearance between an upper end of each of said first and second column installation sections and said body installation section.

2. The steering column as claimed in claim 1, wherein said lower bracket is formed of a plate material and includes a main body section, a body installation section integral with said main body section and for connecting to the vehicle body, and means defining an opening at least in said main body section, said jacket tube extending through said opening, said opening being defined by an inner peripheral edge of said lower bracket, said jacket tube being securely connected to a part of the inner peripheral edge.

3. The steering column as claimed in claim 2, wherein said lower bracket is formed with first and second bent portions which are located below said opening and positioned at the opposite sides of a vertical plane containing a central axis of said jacket tube.

4. The steering column as claimed in claim 2, wherein said lower bracket has first and second reinforcement flanges which are integral with at least said main body section and extend generally parallel with a vertical plane containing a central axis of said jacket tube.

5. The steering column as claimed in claim 2, wherein each of said upper and lower brackets is formed of a metal plate, wherein said jacket tube is formed of a metal plate.

6. The steering column as claimed in claim 5, wherein said jacket tube is welded to a part of the inner peripheral edge.

7. The steering column as claimed in claim 1, wherein said steering shaft is disposed between and secured to said first and second column installation sections.

8. The steering column as claimed in claim 1, wherein each of said first and second bent sections of said upper bracket includes an inclined flat plate portion which extends perpendicular to a vertical plane containing a central axis of said jacket tube, said flat plate portion having a predetermined width and having a first end which is integrally connected by a first linear bent portion with each of the first and second side portions of said body installation section and a second end which is integrally connected by a second linear bent portion with each of said first and second front wall sections.

9. A steering column for an automotive vehicle, comprising:
    a jacket tube;
    a steering shaft which is axially contractible and has a major part rotatably disposed through bearings inside said jacket tube;
    a lower bracket fixed to a lower section of said jacket tube; and
    an upper bracket secured to a generally intermediate section of said jacket tube;
    wherein said upper bracket includes
        a body installation section for connecting to a vehicle body, said body installation section having first and second side portions which are separate from each other,
        first and second front wall sections which respectively extend from and are integral with the first and second side portions of said installation section, said first and second front wall sections being respectively generally perpendicular to the first and second side portions of said installation section,
        first and second column installation sections which are respectively integral with and generally perpendicular to the first and second front wall sections, said first and second column installation sections extending generally rearward relative to the vehicle body, the generally intermediate section of said jacket tube being secured to said first and second column installation sections,
        first and second bent sections each of which is located between each side portion of said body installation section and each of said first and second front wall section, each bent section being adapted to be deformable under a load over a predetermined level such that an angle between the side portion of said body installation section and each of said first and second bent sections decreases, and
        means defining a predetermined clearance between an upper end of each of said first and second column installation sections and said body installation section, said predetermined clearance for limiting the rearward motion of the jacket tube.

* * * * *